(12) United States Patent
Fujimoto et al.

(10) Patent No.: US 12,044,953 B2
(45) Date of Patent: Jul. 23, 2024

(54) VIBRATION UNIT AND OPTICAL DETECTION DEVICE

(71) Applicant: Murata Manufacturing Co., Ltd., Nagaokakyo (JP)

(72) Inventors: Katsumi Fujimoto, Nagaokakyo (JP); Kenji Nishiyama, Nagaokakyo (JP); Yasuhiro Kuratani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1007 days.

(21) Appl. No.: 16/999,105

(22) Filed: Aug. 21, 2020

(65) Prior Publication Data

US 2020/0379320 A1  Dec. 3, 2020

Related U.S. Application Data

(63) Continuation of application No. PCT/JP2019/002547, filed on Jan. 25, 2019.

(30) Foreign Application Priority Data

Jun. 28, 2018  (JP) .................................. 2018-123354

(51) Int. Cl.
*G03B 17/56* (2021.01)
*G02B 27/64* (2006.01)

(52) U.S. Cl.
CPC ........... *G03B 17/56* (2013.01); *G02B 27/646* (2013.01); *G03B 2205/0061* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 10,768,507 B2 * | 9/2020 | Fujimoto | H10N 30/206 |
| 2011/0120494 A1 * | 5/2011 | Ifuku | B08B 7/02 |
| | | | 15/94 |
| 2012/0243093 A1 * | 9/2012 | Tonar | H10N 30/20 |
| | | | 359/507 |
| 2017/0361360 A1 | 12/2017 | Li et al. | |
| 2018/0095272 A1 | 4/2018 | Fujimoto et al. | |

(Continued)

FOREIGN PATENT DOCUMENTS

| | | |
|---|---|---|
| JP | 2007-189802 A | 7/2007 |
| JP | 2009-265473 A | 11/2009 |

(Continued)

OTHER PUBLICATIONS

Official Communication issued in International Patent Application No. PCT/JP2019/002547, mailed on Apr. 16, 2019.

(Continued)

*Primary Examiner* — Rodney E Fuller
(74) *Attorney, Agent, or Firm* — Keating & Bennett, LLP

(57) ABSTRACT

A vibration unit includes a light transmitting member including at least a portion of a detection region of an imaging element, and a vibration element including a vibrating body coupled to the light transmitting member. The light transmitting member includes a central region and a peripheral region located around the central region. The light transmitting member includes a hydrophilic film in the peripheral region thereof.

19 Claims, 5 Drawing Sheets

(56) References Cited

U.S. PATENT DOCUMENTS

2018/0214016 A1* 8/2018 Thommen .............. A61B 1/233
2020/0039475 A1* 2/2020 Ichiguchi ............... H04N 23/52

FOREIGN PATENT DOCUMENTS

| JP | 4964049 B2 | 6/2012 |
| JP | 2012-138768 A | 7/2012 |
| JP | 2013-080177 A | 5/2013 |
| JP | 2015-231216 A | 12/2015 |
| JP | 2017-170303 A | 9/2017 |
| WO | 2011/078218 A1 | 6/2011 |
| WO | 2017/022382 A1 | 2/2017 |

OTHER PUBLICATIONS

Official Communication issued in corresponding Japanese Patent Application No. 2020-527178, mailed on Apr. 13, 2021.

* cited by examiner

VIBRATION UNIT AND OPTICAL DETECTION DEVICE

CROSS REFERENCE TO RELATED APPLICATIONS

This application claims the benefit of priority to Japanese Patent Application No. 2018-123354 filed on Jun. 28, 2018 and is a Continuation Application of PCT Application No. PCT/JP2019/002547 filed on Jan. 25, 2019. The entire contents of each application are hereby incorporated herein by reference.

BACKGROUND OF THE INVENTION

1. Field of the Invention

The present invention relates to a vibration unit and an optical detection device that are capable of removing water droplets and other substances using mechanical vibration.

2. Description of the Related Art

Conventionally, imaging devices, such as cameras used as monitoring devices, have been required to always provide a clear field of view. In particular, for cameras for outdoor use, such as car-mounted cameras, various mechanisms for removing water droplets, such as raindrops, have been proposed. International Publication No. 2017/022382 discloses a vibration unit having a light transmitting portion disposed on the front side of a camera body. The vibration unit vibrates the light transmitting portion to a significant degree to atomize water droplets adhering to a light transmitting body. International Publication No. 2017/022382 describes a technique which involves moving water droplets toward a hydrophilic portion which is disposed outside an imaging region.

In the vibration unit described in International Publication No. 2017/022382, a vibration antinode and a vibration node are formed in a portion of the light transmitting portion located in a field-of-view region of the camera body. In this case, water droplets adhering to the light transmitting portion are moved toward the vibration antinode and atomized in the vicinity of the vibration antinode. However, water droplets located at the vibration node are not easily moved toward the vibration antinode. As a result, water droplets remain and this may interfere with the field of view of the camera body.

SUMMARY OF THE INVENTION

Preferred embodiments of the present invention provide vibration units and optical detection devices that are each capable of more reliably providing a detection region of an optical detection element.

A vibration unit according to a preferred embodiment of the present invention includes a light transmitting member disposed to include at least a portion of a detection region of an optical detection element, and a vibration element including a vibrating body coupled to the light transmitting member. The light transmitting member includes a central region and a peripheral region located around the central region. The light transmitting member includes a hydrophilic film in the peripheral region thereof.

An optical detection device according to a preferred embodiment of the present invention includes a vibration unit accordance to a preferred embodiment of the present invention, and an optical detection element disposed to allow a detection region to be included in the light transmitting member.

Preferred embodiments of the present invention provide vibration units and optical detection devices that are each capable of more reliably providing a detection region of an optical detection element.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will now be described by explaining preferred embodiments of the present invention.

Note that the preferred embodiments described in the present specification are for illustrative purposes, and some components in different preferred embodiments may be replaced or combined.

Figure 1:
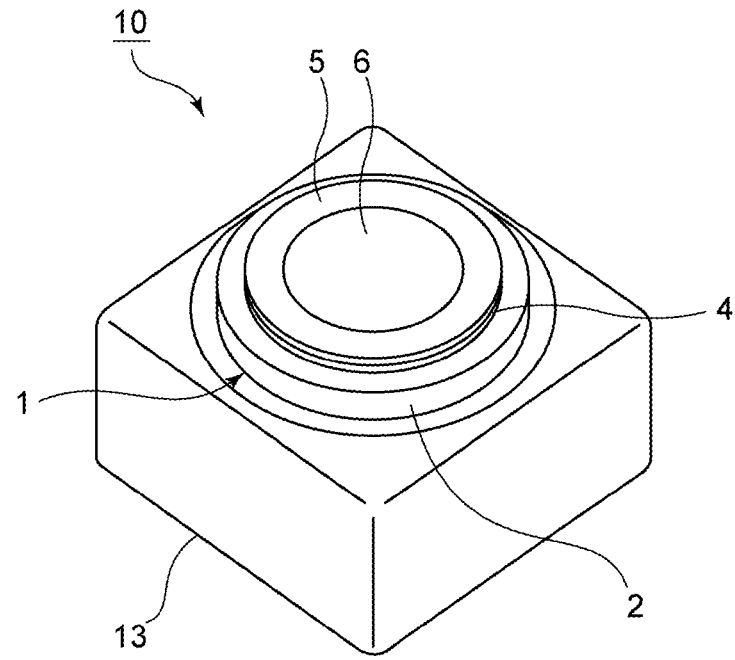
FIG. 1 is a schematic perspective view of an imaging device including a vibration unit according to a first preferred embodiment of the present invention.
Figure 2:
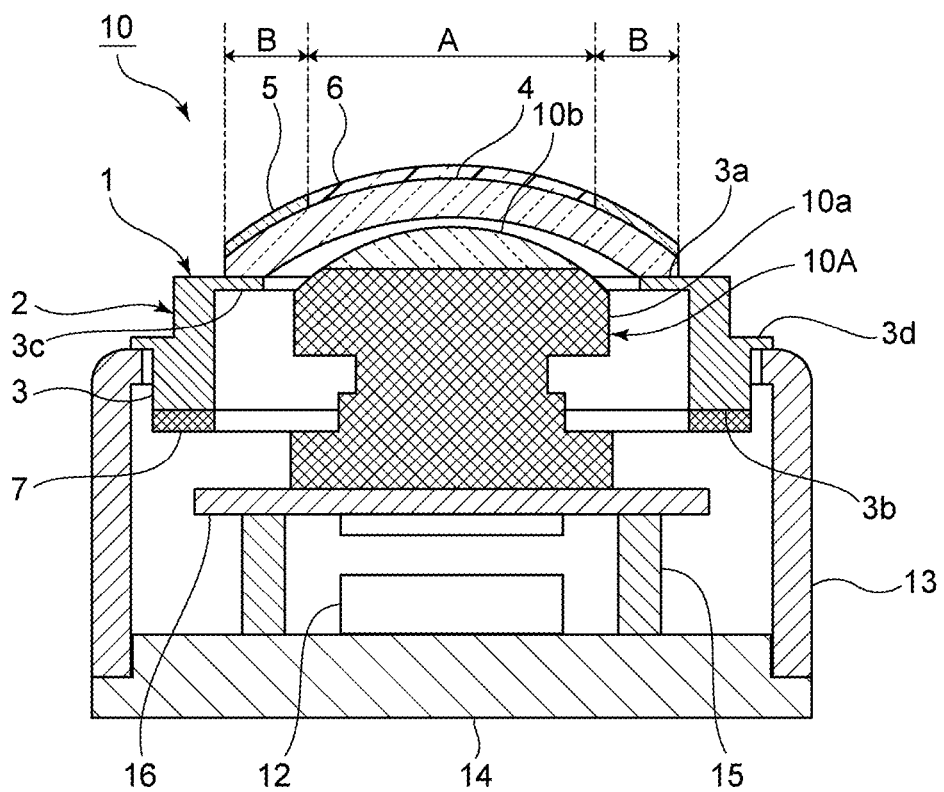
FIG. 2 is a schematic elevational cross-sectional view of the imaging device including the vibration unit according to the first preferred embodiment of the present invention.

FIG. 1 is a schematic perspective view of an imaging device including a vibration unit according to a first preferred embodiment of the present invention. FIG. 2 is a schematic elevational cross-sectional view of the imaging device including the vibration unit according to the first preferred embodiment. Note that a controller (described below) may not be shown in cross-sectional views, except FIG. 2.

An imaging device 10 illustrated in FIG. 1 includes a vibration unit 1. The vibration unit 1 is a vibration unit that vibrationally moves water droplets and foreign matter, or atomizes water droplets and other substances, to remove the water droplets and foreign matter from inside the field of view of an imaging element. As illustrated in FIG. 2, the vibration unit 1 includes a vibration element 2 including a cylindrical vibrating body 3, a light transmitting member 4 disposed to cover an opening portion of the vibration element 2, and a controller 12 electrically connected to the vibration element 2.

The imaging device 10 includes a cylindrical case member 13 that supports at one end thereof the vibration unit 1, and a base member 14 that is secured to the other end of the case member 13. An imaging element 10A is disposed in an internal space defined by the vibration unit 1, the case member 13, and the base member 14. The imaging device 10 is thus provided, which serves as an optical detection device according to a preferred embodiment of the present invention.

Examples of the imaging element 10A include a CMOS, a CCD, a bolometer, and a thermopile that receive light of an appropriate wavelength in the visible to far-infrared region. Examples of the imaging device 10 include a camera, a radar, and a LIDAR device.

As illustrated in FIG. 2, the case member 13 is secured onto the base member 14. A plurality of leg portions 15 are secured onto the base member 14. A substrate 16 is secured onto the leg portions 15. The imaging element 10A is secured onto the substrate 16. The imaging element 10A includes an imaging-element main body 10a and a lens module 10b. A portion of the imaging element 10A on the side of the lens module 10b is located in an internal space of the vibration unit 1, and the remaining portion of the imaging element 10A is located in an internal space of the case member 13. The entire imaging element 10A may be located in the internal space of the vibration unit 1.

In the present preferred embodiment, at least one principal surface of the substrate 16 or one principal surface of the base member 14 includes thereon a circuit and the controller 12 that drive the imaging element 10A.

Instead of the imaging element 10A, an optical detection element that optically detects an energy beam may be disposed in the internal space defined by the vibration unit 1, the case member 13, and the base member 14. The energy beam to be detected may be, for example, an active energy beam, such as an electromagnetic wave or an infrared ray. In the imaging device 10 illustrated in FIG. 2, a field of view defining and functioning as a detection region of the imaging element 10A is included in the light transmitting member 4. In the present preferred embodiment, the center of the field of view is located in a central region A of the light transmitting member 4, and a peripheral region of the field of view is located in a peripheral region B of the light transmitting member 4. The configuration is not limited to this, and it is only necessary that the light transmitting member 4 is disposed to include at least a portion of the field of view of the imaging element 10A. In the present specification, light transmittance refers to light transmitting properties that allow transmission of at least an energy beam or light of a wavelength detected by the optical detection element.

The imaging device 10 illustrated in FIG. 1 and FIG. 2 is merely an example, and the configuration of the imaging device 10 is not limited to that described above. The imaging device 10 may be of any type that includes the vibration unit 1 and the imaging element 10A.

Details of the vibration unit 1 will now be described.

As illustrated in FIG. 2, the vibration element 2 includes the vibrating body 3 and a piezoelectric vibrator 7. In the present preferred embodiment, the vibrating body 3 is circular cylindrical or substantially circular cylindrical and includes a first opening end portion 3a and a second opening end portion 3b. A direction connecting the first opening end portion 3a and the second opening end portion 3b is defined as an axial direction, and a direction orthogonal or substantially orthogonal to the axial direction is defined as a radial direction. The vibrating body 3 includes an extending portion 3c located on the side of the first opening end portion 3a and extending inward in the radial direction. The light transmitting member 4 is coupled to a portion of the first opening end portion 3a located at the extending portion 3c, so as to cover an opening portion of the vibrating body 3.

The vibrating body 3 includes a hinge portion 3d located between the first opening end portion 3a and the second opening end portion 3b. The hinge portion 3d extends outward in the radial direction. The vibration unit 1 is supported at the hinge portion 3d by the case member 13. When the thickness of the vibrating body 3 in the radial direction is defined as a wall thickness, the wall thickness of a portion located between the hinge portion 3d and the extending portion 3c is thinner than the wall thickness of a portion located between the hinge portion 3d and the second opening end portion 3b.

The vibrating body 3 does not necessarily need to have the hinge portion 3d and the extending portion 3c, and the wall thickness may be uniform or substantially uniform throughout the vibrating body 3. The vibrating body 3 may have any cylindrical shape. For example, the vibrating body 3 may have a circular or angular cylindrical shape.

In the vibration element 2, the piezoelectric vibrator 7 is disposed on the second opening end portion 3b of the vibrating body 3. The piezoelectric vibrator 7 vibrates a combined unit of the light transmitting member 4 and the vibrating body 3.

Figures 3, 4:
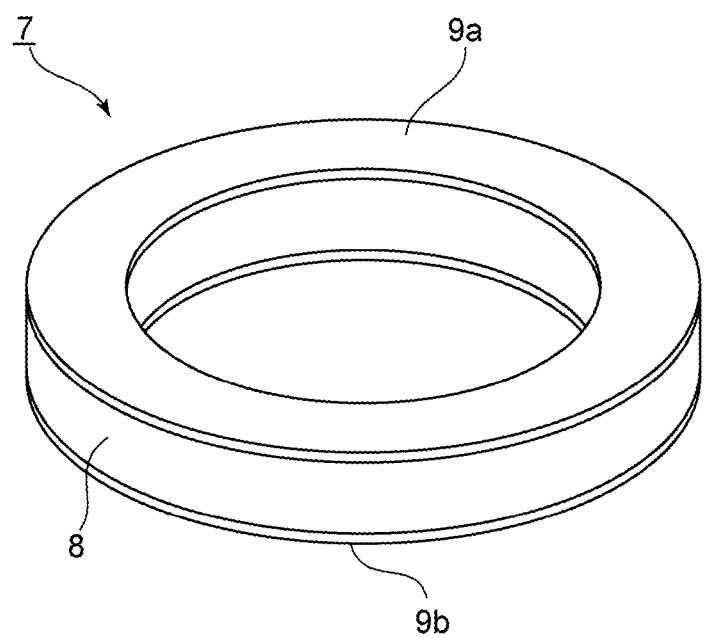
FIG. 3 is a schematic perspective view of a piezoelectric vibrator according to the first preferred embodiment of the present invention.
FIG. 4 is a schematic diagram for explaining each vibration mode.

FIG. 3 is a schematic perspective view of a piezoelectric vibrator according to the first preferred embodiment.

The piezoelectric vibrator 7 includes an annular piezoelectric body 8. For example, the piezoelectric body 8 is made of an appropriate piezoelectric ceramic material, such as Pb (Zr, Ti) $O_3$ or (K, Na) $NbO_3$, or may be made of an appropriate piezoelectric single crystal, such as $LiTaO_3$ or $LiNbO_3$. The piezoelectric body 8 includes an electrode 9a on one principal surface thereof, and an electrode 9b on the other principal surface thereof.

In the present preferred embodiment, one piezoelectric vibrator 7 with an annular shape is disposed on the vibrating body 3. However, the shape and number of the piezoelectric vibrator 7 are not limited to this. For example, a plurality of piezoelectric vibrators may be provided along the circumferential direction, in plan view, about the rotation axis at the center of the vibrating body 3.

Although the light transmitting member 4 is dome-shaped in the present preferred embodiment, the shape of the light transmitting member 4 is not limited to this. For example, the light transmitting member 4 may be disk-shaped. The light transmitting member 4 is made of a light transmitting material. Examples of the light transmitting material include light transmitting plastic, glass, and light transmitting ceramic material.

The light transmitting member 4 includes the central region A and the peripheral region B located around the central region A. The light transmitting member 4 includes a water-repellent film 6 in the central region A thereof. At the same time, the light transmitting member 4 includes a hydrophilic film in the peripheral region B thereof. More specifically, the hydrophilic film 5 and the water-repellent film 6 are disposed on the outer surface of the light transmitting member 4 that allows light and energy beams to enter the vibration unit 1. The water-repellent film 6 is preferably made of, for example, a fluorocarbon material, such as polytetrafluoroethylene, or a silicon material, such as silane containing a perfluoroalkyl group. The hydrophilic film 5 is preferably made of, for example, an inorganic material, such as $TiO_2$, or an organic material, such as hydrophilic PVDF. The light transmitting member 4 does not necessarily need to include the water-repellent film 6 thereon.

The controller 12 is electrically connected to the vibration element 2. More specifically, the controller 12 is electrically connected to the piezoelectric vibrator 7. The controller 12 controls the piezoelectric vibrator 7 to vibrate the combined unit of the light transmitting member 4 and the vibrating body 3. The controller 12 may perform switching between a plurality of vibration modes. In the present preferred embodiment, the controller 12 vibrates the combined unit of the light transmitting member 4 and the vibrating body 3 such that the vibration node is located at the hinge portion 3d of the vibrating body 3. This enables the case member 13 to easily support the vibration unit 1, and improves the hermeticity of the imaging device 10. Also, this makes it less likely that support by the case member 13 interferes with the vibration of the vibration unit 1.

In the present preferred embodiment, the light transmitting member 4 includes the hydrophilic film 5 in the peripheral region B thereof. This makes it possible to more reliably ensure the field of view of the imaging element 10A, which defines and functions as a detection region of the optical detection element. This will be described, along with details of vibration modes used by the vibration unit 1.

FIG. 4 is a schematic diagram for explaining each vibration mode. FIG. 4 illustrates the phase of vibration in each region of the light transmitting member in plan view. A region with a positive (+) sign and a region with a negative (−) sign are in opposite phases of vibration.

Each vibration mode is represented by (m, n) mode, where m and n are both integers. Note that m represents the number of vibration node lines extending in the circumferential direction, and n represents the number of vibration node lines extending in the radial direction. In the present preferred embodiment, (1, 0) mode, (1, 1) mode, or (1, 2) mode is preferably used. The vibration node line extending in the circumferential direction in (1, 0) mode, (1, 1) mode, and (1, 2) mode is located in the peripheral region B of the light transmitting member 4.

The piezoelectric vibrator 7 of the vibration unit 1 is configured so as to be capable of exciting vibration of (1, 0) mode, (1, 1) mode, or (1, 2) mode in the light transmitting member 4. The controller 12 controls, for example, a voltage applied to the piezoelectric vibrator 7 to excite the vibration of (1, 0) mode, (1, 1) mode, or (1, 2) mode.

Figure 5A:
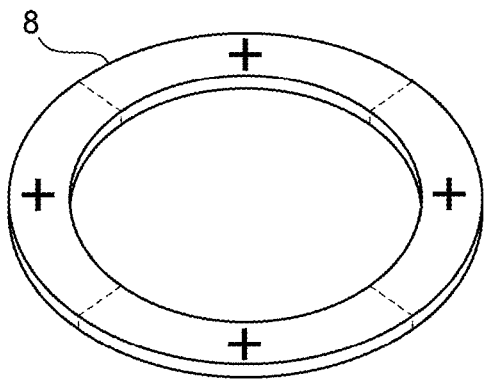
FIGS. 5A to 5C are each a schematic perspective view for explaining an exemplary polarization structure of a piezoelectric body according to the first preferred embodiment of the present invention.
Figure 5B:
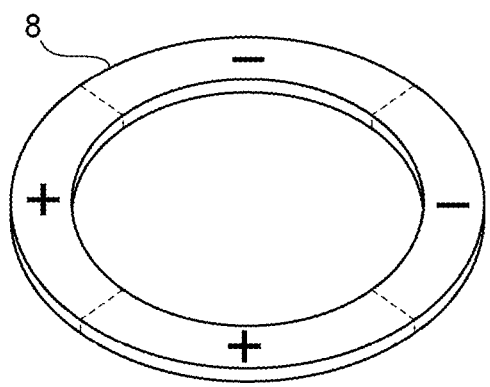
Figure 5C:
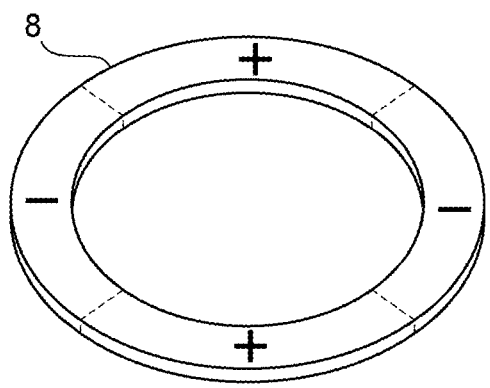

FIGS. 5A to 5C are each a schematic perspective view for explaining an exemplary polarization structure of a piezoelectric body according to the first preferred embodiment. In FIG. 5A, a region with a positive (+) sign is a region where a polarization direction is from the lower surface toward the upper surface of the piezoelectric body in FIG. 5A. A region with a negative (−) sign is a region where a polarization direction is from the upper surface toward the lower surface of the piezoelectric body. The same applies to FIGS. 5B and 5C.

In FIG. 5A, all if the regions arranged in the circumferential direction have the same polarization direction. The electrode 9a and the electrode 9b of the piezoelectric vibrator 7 illustrated in FIG. 3 have an annular shape. Therefore, when the piezoelectric body 8 with the polarization structure illustrated in FIG. 5A is used, vibration of (1, 0) mode is excited in the light transmitting member 4. Of four separate regions arranged in the circumferential direction in FIG. 5B, those on opposite sides of the center have opposite polarization directions. When the piezoelectric body 8 with the polarization structure illustrated in FIG. 5B is used, vibration of (1, 1) mode is excited in the light transmitting member 4. Of four separate regions arranged in the circumferential direction in FIG. 5C, those on opposite sides of the center have the same polarization direction. When the piezoelectric body 8 with the polarization structure illustrated in FIG. 5C is used, vibration of (1, 2) mode is excited in the light transmitting member 4.

The electrode 9a and the electrode 9b illustrated in FIG. 3 may each be divided into segments in the circumferential direction, and the resulting electrode segments may be arranged in the respective regions of the piezoelectric body 8 described above. In this case, even when the piezoelectric body 8 with the polarization structure illustrated in FIG. 5A is used, if alternating voltages of opposite phases are applied to the regions on opposite sides of the center, vibration of (1, 1) mode can be excited in the light transmitting member 4. Alternatively, if alternating voltages of the same phase are applied to the regions on opposite sides of the center, vibration of (1, 2) mode can be excited in the light transmitting member 4. The controller 12 may perform switching between the vibration modes.

A vibration antinode in (1, 0) mode, (1, 1) mode, and (1, 2) mode is located in the central region A of the light transmitting member 4 illustrated in FIG. 2. Water droplets and other substances adhering to the vicinity of the vibration antinode in the light transmitting member 4 are atomized and removed. Water droplets and other substances are further moved toward the vibration antinode. Thus, water droplets and other substances not located in the vicinity of the vibration antinode can be moved toward the vibration antinode, atomized, and removed.

On the other hand, a vibration node in (1, 0) mode, (1, 1) mode, and (1, 2) mode is located in the peripheral region B of the light transmitting member 4. Water droplets and other substances in the vicinity of the vibration node cannot be either atomized or easily moved. With the conventional configuration, as described above, water droplets remain and this may make it difficult to ensure a sufficient field of view of the imaging element.

In the present preferred embodiment illustrated in FIG. 2, on the other hand, the light transmitting member 4 includes the hydrophilic film 5 in the peripheral region B thereof. More specifically, in the peripheral region B, the hydrophilic film 5 covers a portion where a vibration node is located. In the present specification, a portion located at a vibration node includes a portion located in the vicinity of the vibration node. It is thus possible to flatten water droplets and other substances located at the vibration node and reduce optical problems caused by adherence of water droplets and other substances. On the other hand, water droplets and other substances located in the central region A of the light transmitting member 4 can be easily moved and atomized. Therefore, it is possible to more reliably ensure the field of view of the imaging element 10A.

It is preferable, as in the present preferred embodiment, that the water-repellent film 6 is provided in the central region A. This makes it possible to more easily move and atomize water droplets and other substances. In the vibration unit 1, the light transmitting member 4 includes the water-repellent film 6 over the entire or substantially the entire central region A thereof. In this case, it is preferable to use (1, 0) mode in which a vibration node is not located in the central region A. This makes it possible to more reliably and more easily move and atomize water droplets and other substances. The controller 12 may perform switching between (1, 0) mode and another vibration mode.

The water-repellent film 6 may be provided in a portion of the central region A. In this case, it is preferable that the water-repellent film 6 be provided at a portion of the light transmitting member 4 where a vibration antinode is located. This makes it easier to atomize water droplets and other substances.

The hydrophilic film 5 is provided over the entire or substantially the entire peripheral region B. The hydrophilic film 5 may be provided only at a portion where a vibration node in vibration mode to be used is located. It is still possible, in this case, to flatten water droplets and other substances located at the vibration node and to more reliably ensure the field of view of the imaging element 10A.

In the present preferred embodiment, a vibration node is located in a region of the light transmitting member 4 including the field of view of the imaging element 10A. The peripheral region B of the light transmitting member 4 includes the hydrophilic film 5 in a region including the field of view of the imaging element 10A. This can reduce optical problems in the field of view of the imaging element 10A, caused by water droplets and other substances. In the peripheral region B, even when the vibration node is located in a region not including the field of view of the imaging element 10A, water droplets and other substances that remain and increase in volume at a portion where the vibration node is located may enter the field of view of the imaging element 10A, and this may make it difficult to ensure the field of view. In the peripheral region B, the hydrophilic film 5 may be provided in a region not including the field of view of the imaging element 10A. This can reduce entry of water droplets and other substances, which may cause optical problems, into the field of view. Therefore, it is still possible in this case to more reliably ensure the field of view of the imaging element 10A.

Figure 6:
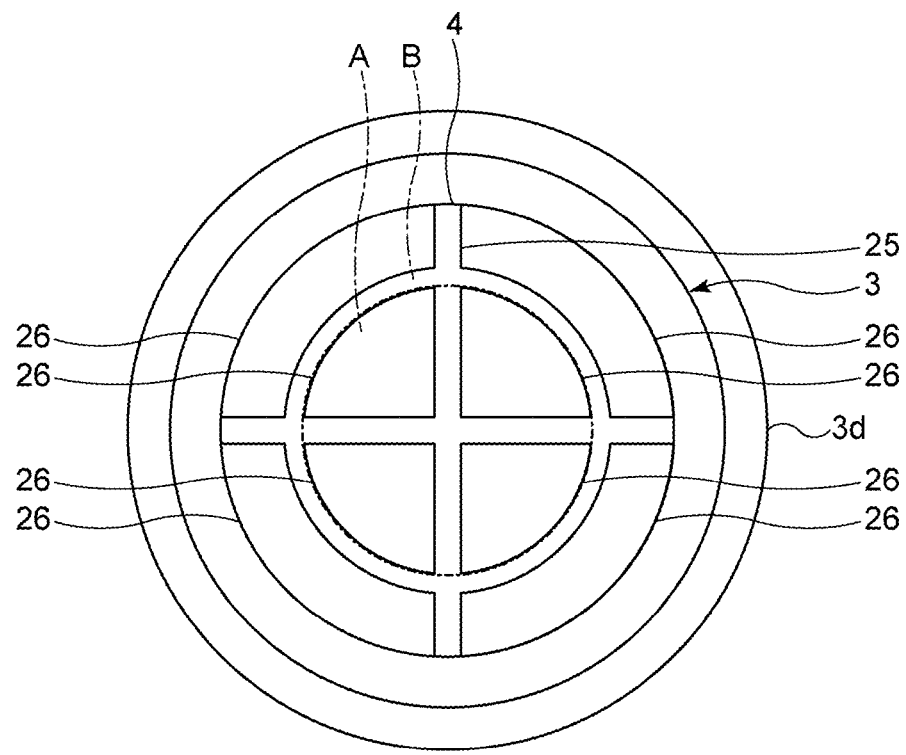
FIG. 6 is a plan view of a vibration unit according to a second preferred embodiment of the present invention.

FIG. 6 is a plan view of a vibration unit according to a second preferred embodiment of the present invention.

The present preferred embodiment differs from the first preferred embodiment in the arrangement of a hydrophilic film 25 and water-repellent films 26. Other than this, the vibration unit according to the present preferred embodiment is configured similarly to the vibration unit 1 according to the first preferred embodiment.

In the present preferred embodiment, (1, 2) mode is used. In (1, 2) mode, a plurality of vibration antinodes are located in the light transmitting member 4. A vibration node is located at the boundary between adjacent ones of the vibration antinodes. In the peripheral region B and the central region A of the light transmitting member 4, the hydrophilic film 25 is located at the boundary between adjacent ones of the vibration antinodes and provided in a portion located at a vibration node. Thus, in the central region A of the light transmitting member 4 as well as in the peripheral region B, water droplets and other substances adhering to the portion located at the vibration node can be flattened and optical problems can be reduced.

There are provided a plurality of water-repellent films 26, which are disposed at respective portions where the vibration antinodes are located. This makes it possible to more easily move and atomize water droplets and other substances adhering to portions outside the portion where the vibration node is located. It is thus possible to more reliably ensure the field of view of the imaging element 10A.

The present preferred embodiment presents an example of using (1, 2) mode. In the case of using (1, 1) mode or any other vibration mode, it is preferable, in the vibration mode to be used, that the hydrophilic film 25 be disposed at a portion where the vibration node is located and the water-repellent films 26 be disposed at a portion where the vibration antinode is located. This makes it possible to more reliably ensure the field of view of the imaging element 10A.

Figure 7:
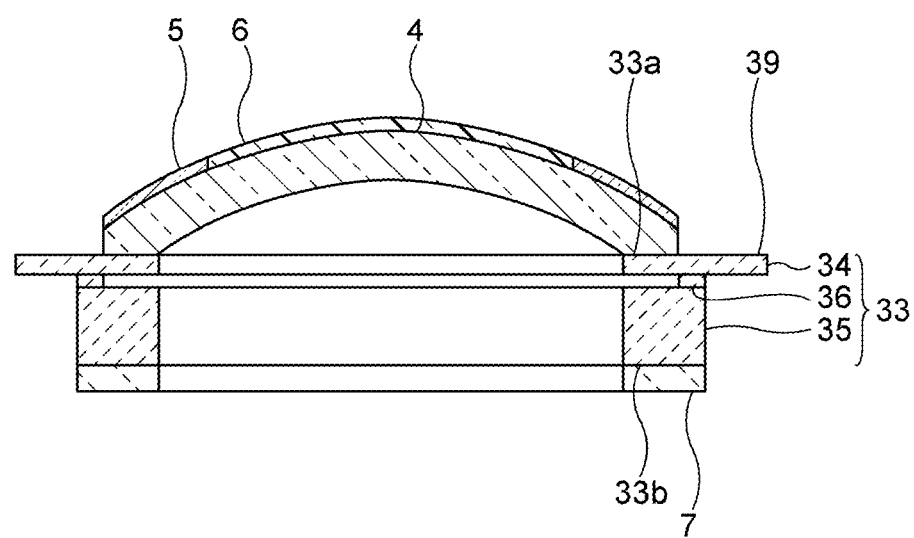
FIG. 7 is a schematic elevational cross-sectional view of a vibration unit according to a third preferred embodiment of the present invention.

FIG. 7 is a schematic elevational cross-sectional view of a vibration unit according to a third preferred embodiment of the present invention.

The present preferred embodiment differs from the first preferred embodiment in the configuration of a vibrating body 33. Other than this, the vibration unit according to the present preferred embodiment is configured similarly to the vibration unit 1 according to the first preferred embodiment.

The vibrating body 33 includes a first vibrating body portion 34 located on the side of a first opening end portion 33a, a second vibrating body portion 35 located on the side of a second opening end portion 33b, and a coupling portion 36 that couples the first vibrating body portion 34 to the second vibrating body portion 35. The first vibrating body portion 34 and the coupling portion 36 have an annular shape, and the second vibrating body portion 35 has a circular cylindrical or substantially circular cylindrical shape. The vibrating body 33 is a cylindrical body in which the first vibrating body portion 34 having an annular shape, the coupling portion 36 having an annular shape, and the second vibrating body portion 35 having a circular cylindrical or substantially circular cylindrical shape are arranged such that their central axes are coaxial.

Note that unless otherwise specified in the present specification, an outer edge and an inner edge refer to an outer edge and an inner edge in plan view. In plan view, the first vibrating body portion 34 includes a flange 39 that sticks out of the second vibrating body portion 35. The outer edge of the flange 39 is located outside the outer edge of the second vibrating body portion 35. In plan view, the vibrating body 33 includes the flange 39 sticking out of the other portion of the vibrating body 33. The outer edge of the flange 39 is located outside the outer edge of the other portion of the vibrating body 33. In the present preferred embodiment, the first vibrating body portion 34 includes the flange 39. More specifically, the flange 39 of the first vibrating body portion 34 is a portion sticking out of the outer edge of the coupling portion 36 directly coupled to the first vibrating body portion 34.

In plan view, the outer edges of the coupling portion 36 and the second vibrating body portion 35 coincide, and the inner edge of the coupling portion 36 is located outside the inner edges of the second vibrating body portion 35 and the first vibrating body portion 34. When the distance between the outer and inner side surfaces of each portion of the vibrating body 33 in the radial direction is defined as a wall thickness, the wall thickness of the coupling portion 36 is thinner than the wall thickness of the second vibrating body portion 35. The inside diameter of the vibrating body 33 at the coupling portion 36 is greater than that at the other portions thereof.

Besides (1, 0) mode, (1, 1) mode, or (1, 2) mode, a vibration mode where the vibration antinode is located at the outer edge of the flange 39 is used in the present preferred embodiment. Here, a mode where vibration of (m, n) mode is excited in the light transmitting member 4 is referred to as a first vibration mode, and a vibration mode where the vibration antinode is located at the outer edge of the flange 39 is referred to as a second vibration mode.

Figure 8:
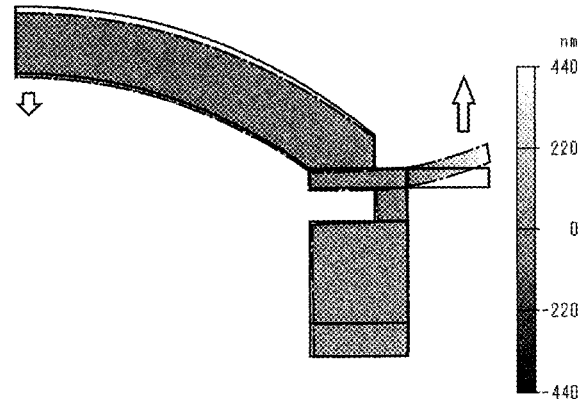
FIG. 8 is a schematic cross-sectional view for explaining a second vibration mode according to the third preferred embodiment of the present invention.

FIG. 8 is a schematic cross-sectional view for explaining the second vibration mode according to the third preferred embodiment. FIG. 8 illustrates a portion corresponding to half of the cross-section of the vibration unit illustrated in FIG. 2. A solid line represents the original state of the vibration unit, and a dotted-chain line represents a vibrating state.

The second vibration mode is a vibration mode where the amplitude at the outer edge of the flange 39 is maximum. The amplitude of the light transmitting member 4 is small in the second vibration mode. The controller 12 of the present preferred embodiment performs switching between the first vibration mode and the second vibration mode.

In the second vibration mode, water droplets and other substances located in the vicinity of a portion where the light transmitting member 4 and the vibrating body 3 are coupled, and also in the vicinity of the outer edge of the light transmitting member 4, can be easily moved to the outer edge of the flange 39. The water droplets and other substances located in the vicinity of the outer edge of the light transmitting member 4 can thus be removed. Additionally, by atomizing the water droplets and other substances that have been moved to the outer edge of the flange 39, more reliable removal of water droplets and other substances is achieved. In the first vibration mode, optical problems relating to water droplets and other substances located outside the vicinity of the outer edge of the light transmitting member 4 can be reduced, or the water droplets and other substances can be moved and atomized, as in the first preferred embodiment. More specifically, optical problems can be reduced by flattening water droplets and other substances located in the vicinity of the vibration node, and water droplets and other substances located outside the vicinity of the vibration node can be removed by moving and atomizing them. Thus, by switching the vibration mode, water droplets and other substances can be more reliably removed, and the field of view of the imaging element 10A can be more reliably ensured.

Additionally, in the present preferred embodiment, as in the first preferred embodiment, the light transmitting member 4 includes the hydrophilic film 5 over the entire or substantially the entire peripheral region B thereof, and the hydrophilic film extends to the vicinity of the outer edge of the light transmitting member 4. This enables water droplets and other substances flattened at the portion with the hydrophilic film 5 to be quickly moved to the flange 39 in the second vibration mode and thus to be removed from the light transmitting member 4. Therefore, it is possible to more reliably ensure the field of view of the imaging element 10A.

As described above, in the present preferred embodiment, the first vibrating body portion 34 includes the flange 39. Alternatively, the second vibrating body portion 35 or the coupling portion 36 may include the flange 39. It is only required that the flange 39 is disposed on one side of the center of the vibrating body 33 in the axial direction, adjacent to the light transmitting member 4.

In the present preferred embodiment, the light transmitting member 4 is coupled to the outermost portion of the vibrating body 33 in the axial direction. In this axial direction, the position of the portion where the first vibrating body portion 34 of the vibrating body 33 is coupled to the light transmitting member 4 is the same or substantially the same as the position of the flange 39. Thus, as compared to the case where the position of the coupled portion described above differs from the position of the flange 39 in the axial direction, the coupled portion and the flange 39 can be closer in distance to each other. Therefore, in the second vibration mode, water droplets and other substances can be desirably moved from the vicinity of the coupled portion described above and the outer edge of the light transmitting member 4 to the flange 39.

The configuration is not limited to that described above. The light transmitting member 4 does not necessarily need to be coupled to the outermost portion of the vibrating body 33 in the axial direction. For example, a surface of the first vibrating body portion 34 adjacent to the light transmitting member 4 may include a stepped portion, so as to allow the light transmitting member 4 to be coupled to a portion of the first vibrating body portion 34 that is thinner in the axial direction.

In the present preferred embodiment, the coupling portion 36 is disposed to allow the outer edges of the coupling portion 36 and the second vibrating body portion 35 to coincide in plan view. However, the position of the coupling portion 36 is not limited to this. For example, the outer edges of the coupling portion 36 and the light transmitting member 4 may coincide in plan view. In this case, a portion where the light transmitting member 4 and the first vibrating body portion 34 are coupled extends continuously to the flange 39. This allows water droplets and other substances to more quickly move from the vicinity of the coupled portion described above and the vicinity of the outer edge of the light transmitting member 4 to the flange 39. Additionally, it is possible to make the flange 39 longer without reducing the wall thicknesses of the first vibrating body portion 34 and the coupling portion 36 and without increasing the outside diameter of the first vibrating body portion 34. It is thus possible to increase the amplitude of the flange 39 in the second vibration mode without degrading the strength and increasing the size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A vibration unit comprising:
   a light transmitting member disposed to include at least a portion of a detection region of an optical detection element; and
   a vibration element including a vibrating body coupled to the light transmitting member; wherein
   the light transmitting member includes a central region and a peripheral region located around the central region;
   the light transmitting member includes a hydrophilic film in the peripheral region thereof; and
   the vibrating body includes a flange that sticks out of another portion of the vibrating body in plan view, and an outer edge of the flange is outside an outer edge of the another portion of the vibrating body.

2. The vibration unit according to claim 1, wherein, in the peripheral region of the light transmitting member, the hydrophilic film is in a region including the detection region.

3. The vibration unit according to claim 1, wherein the light transmitting member includes a water-repellent film in the central region thereof.

4. The vibration unit according to claim 3, wherein the water-repellent film is at a portion of the light transmitting member located at a vibration antinode.

5. The vibration unit according to claim 1, wherein the vibration element includes a piezoelectric vibrator disposed on the vibrating body.

6. The vibration unit according to claim 1, wherein the hydrophilic film is at a portion of the light transmitting member located at a vibration node.

7. The vibration unit according to claim 1, further comprising a controller electrically connected to the vibration element to control vibration of a combined unit including the light transmitting member and the vibrating body.

8. The vibration unit according to claim 7, wherein
the controller is configured to vibrate the combined unit such that a plurality of vibration antinodes are located in the light transmitting member; and
the hydrophilic film is at a boundary between adjacent ones of the vibration antinodes.

9. An optical detection device comprising:
the vibration unit according to claim 1; and
an optical detection element disposed such that a detection region is included in the light transmitting member.

10. The optical detection device according to claim 9, wherein the optical detection element includes an imaging element, and the detection region is a field of view.

11. The optical detection device according to claim 9, wherein, in the peripheral region of the light transmitting member, the hydrophilic film is in a region including the detection region.

12. The optical detection device according to claim 9, wherein the light transmitting member includes a water-repellent film in the central region thereof.

13. The optical detection device according to claim 12, wherein the water-repellent film is at a portion of the light transmitting member located at a vibration antinode.

14. The optical detection device according to claim 9, wherein the vibration element includes a piezoelectric vibrator on the vibrating body.

15. The optical detection device according to claim 9, wherein the hydrophilic film is at a portion of the light transmitting member located at a vibration node.

16. The optical detection device according to claim 9, further comprising a controller electrically connected to the vibration element to control vibration of a combined unit including the light transmitting member and the vibrating body.

17. The optical detection device according to claim 16, wherein
the controller is configured to vibrate the combined unit such that a plurality of vibration antinodes are located in the light transmitting member; and
the hydrophilic film is at a boundary between adjacent ones of the vibration antinodes.

18. A vibration unit comprising:
a light transmitting member disposed to include at least a portion of a detection region of an optical detection element; and
a vibration element including a vibrating body coupled to the light transmitting member; wherein
the light transmitting member includes a central region and a peripheral region located around the central region;
the light transmitting member includes a hydrophilic film in the peripheral region thereof; and
the hydrophilic film is at a portion of the light transmitting member located at a vibration node.

19. A vibration unit comprising:
a light transmitting member disposed to include at least a portion of a detection region of an optical detection element; and
a vibration element including a vibrating body coupled to the light transmitting member; wherein
the light transmitting member includes a central region and a peripheral region located around the central region;
the light transmitting member includes a hydrophilic film in the peripheral region thereof;
the light transmitting member includes a water-repellent film in the central region thereof; and
the water-repellent film is at a portion of the light transmitting member located at a vibration antinode.

* * * * *